United States Patent

[11] 3,603,178

| [72] | Inventors | Manfred Lutz;<br>Horst Schulz, both of Schweinfurt am Main, Germany |
|---|---|---|
| [21] | Appl. No. | 875,834 |
| [22] | Filed | Nov. 12, 1969 |
| [45] | Patented | Sept. 7, 1971 |
| [73] | Assignee | Fichtel & Sachs AG<br>Schweinfurt am Main, Germany |
| [32] | Priority | Nov. 15, 1968 |
| [33] | | Germany |
| [31] | | P 18 09 140.2 |

[54] MULTIPLE-SPEED BICYCLE HUB WITH CENTRIFUGAL GOVERNOR
11 Claims, 18 Drawing Figs.

[52] U.S. Cl. .................................................. 74/752 E,
74/336.5, 192/103 B
[51] Int. Cl. ..................................................... F16h 5/46,
F16d 43/04
[50] Field of Search ........................................ 74/752,
336.5; 192/103 B, 105 CD

[56] References Cited
UNITED STATES PATENTS

| 1,784,793 | 12/1930 | Prior | 74/752 X E |
| 1,853,908 | 4/1932 | Lake | 192/105 CD |
| 2,373,234 | 4/1945 | Duffield | 74/752 X E |
| 3,351,165 | 11/1967 | Shimano | 74/750 X |
| 3,494,227 | 2/1970 | Shimano et al. | 74/752 E |
| 1,853,908 | 4/1932 | Lake | 192/105 CD |

FOREIGN PATENTS

| 1,348,324 | 11/1963 | France | 74/750 |
| 632,305 | 11/1949 | Great Britain | 74/752 |

*Primary Examiner*—Carlton R. Croyle
*Assistant Examiner*—Thomas C. Perry
*Attorney*—Kelman and Berman

ABSTRACT: A dual-speed hub for a bicycle is equipped with planetary gearing and with first and second pawl-and-ratchet clutches respectively connecting the hub shell with the driver of the hub, which also serves as planet carrier, and with the faster turning ring gear. The second clutch is normally disengaged by a centrifugal governor whose spring-loaded flyweights are mounted on the pawl carrier of the clutch by means of pivot pins symmetrical relative to the axis of carrier rotation and swing in a common clockwise direction about their pivot axes under the influence of the centrifugal forces sufficient to overcome the flyweight springs. A thin annular disc axially arranged between the flyweights and the carrier couples the flyweights to each other so that they must pivot jointly.

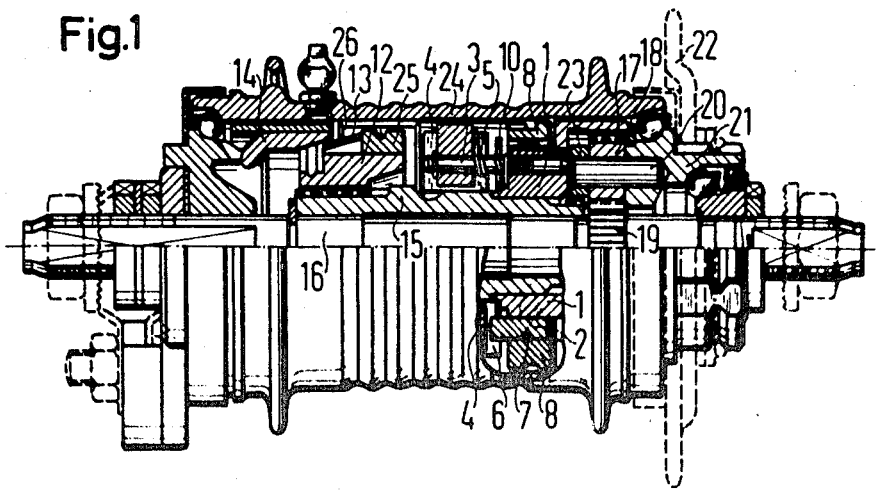
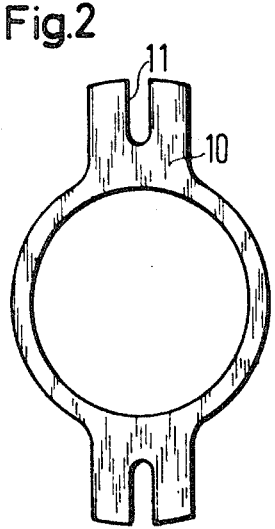
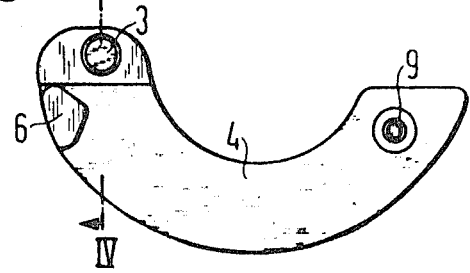
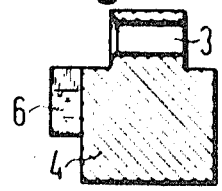
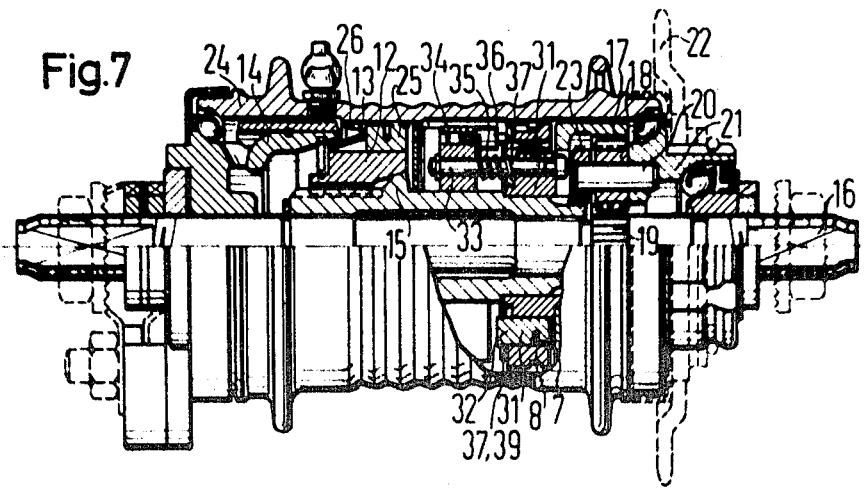

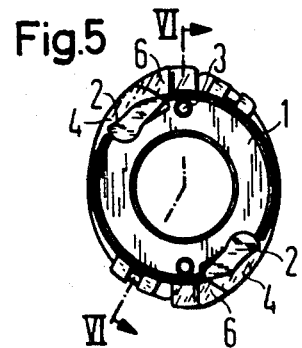
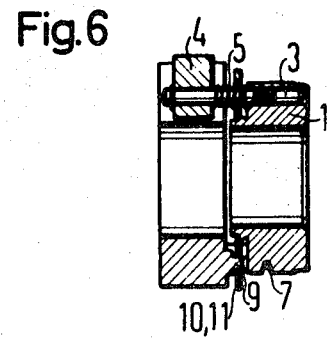
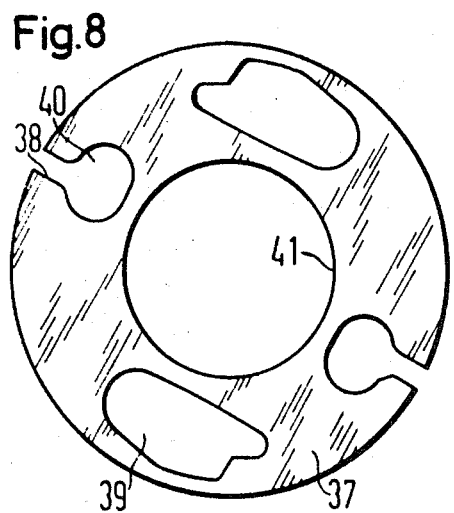
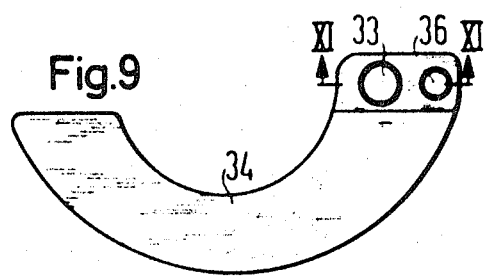
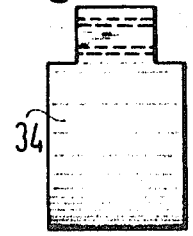
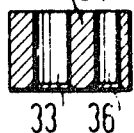
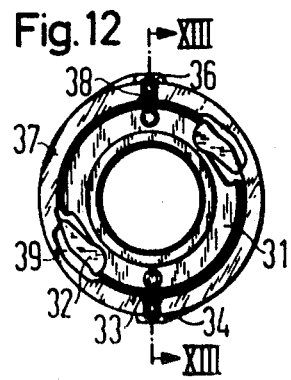
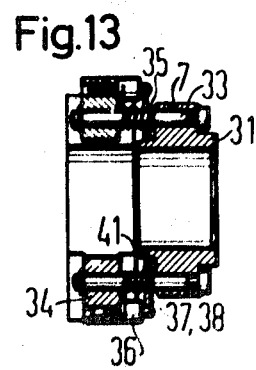

3,603,178

MULTIPLE-SPEED BICYCLE HUB WITH CENTRIFUGAL GOVERNOR

This invention relates to multiple-speed drive arrangements, and particularly to centrifugal governors for changing the transmission ratio of a multiple-speed drive arrangement.

The invention will be described hereinbelow by primary reference to a multiple-speed hub for a bicycle or like vehicle, but other applications are also contemplated. It is known to equip multiple-speed hubs of bicycles with centrifugal governors whose flyweights are rotated about the hub axis by a driving connection either with the driver which is the input member of the hub, or with the hub shell which is the output member. The hub shell encloses a planetary gear transmission whose several gears rotate at different speeds. Pawl-and-ratchet clutches are interposed respectively between the hub shell and the several gears. The hub shell rotates at the speed of the fastest connected gear, and the hub can be shifted to a lower speed by disengaging the clutch associated with the fastest gear.

The centrifugal governor is connected with the pawl or pawls of the last-mentioned clutch to keep the clutch disengaged unless the rotary speed of the flyweights reaches a value at which centrifugal forces can overcome the return springs of the flyweights so that the flyweights release the pawls for driving engagement with the associated ratchet.

In the commonly owned application Ser. No. 838,524, filed on July 2, 1969, now U.S. Pat. No. 3,557,922 a governor has been disclosed, in which two flyweights are mounted on the pawl carrier for the associated clutch on closely juxtaposed pivot pins and swing in opposite angular directions in response to centrifugal forces. The flyweights are coupled to each other for simultaneous movement so as to prevent sudden translatory movement of the hub, as may be caused by an obstacle in the path of the wheel, from causing malfunctioning of the governor.

While the governor of the earlier application has been found effective and reliable in its operation, its elements are relatively complex and need to be manufactured and assembled to fairly close tolerances. It is an object of the present invention to provide a multiple-speed drive arrangement with a centrifugal governor of the general type disclosed in the earlier application which is simpler in its construction without sacrificing any of the desirable operating characteristics of the known device.

More specifically, this invention aims at providing a centrifugal governor assembled from a very small number of parts at least some of which are identical and interchangeable.

Another object of the invention is the provision of a centrifugal governor which is statically and dynamically balanced in all operating positions.

With these and other objects in view, the invention in one of its aspects provides a centrifugal governor with a rotatable carrier on which a plurality of pivots are arranged, the pivots having respective parallel pivot axes symmetrically spaced about the axis of carrier rotation. The flyweights are respectively mounted on the pivots for movement about the pivot axes in a common angular direction in response to centrifugal forces, and are biased in a second common angular direction opposite to the first-mentioned common direction by return springs. A coupling device is mounted for movement about the axis of rotation and couples the flyweights to each other for joint movement in each of the aforementioned common directions.

Other features, additional objects, and many of the attendant advantages of this invention will readily be appreciated as the same becomes better understood by reference to the following detailed description of preferred embodiments when considered in conjunction with the appended drawings in which:

FIG. 1 shows a multiple-speed bicycle hub equipped with a centrifugal governor according to the invention in rear elevation and partly in axial section;

FIG. 2 shows a coupling element of the governor of FIG. 1 in enlarged side elevation;

FIG. 3 illustrates a flyweight of the governor of FIG. 1 in a view corresponding to that of FIG. 2;

FIG. 4 shows the flyweight of FIG. 3 in section on the line III—III;

FIG. 5 shows the governor of the hub of FIG. 1 in side elevation;

FIG. 6 illustrates the device of FIG. 5 in section on the line VI—VI;

FIG. 7 shows the hub of FIG. 1 equipped with a modified governor in partly sectional rear elevation;

FIG. 8 is a side-elevational, enlarged view of a coupling element of the governor of FIG. 7;

FIG. 9 shows a flyweight of the governor of FIG. 7 in a view corresponding to that of FIG. 8;

FIG. 10 illustrates the device of FIG. 9 in enlarged rear elevation;

FIG. 11 is a sectional view of the device of FIG. 9 taken on the line XI—XI;

FIG. 12 shows the governor of the hub of FIG. 7 in side elevation;

FIG. 13 is a section of the governor of FIG. 12 taken on the line XIII—XIII;

Figure 14:
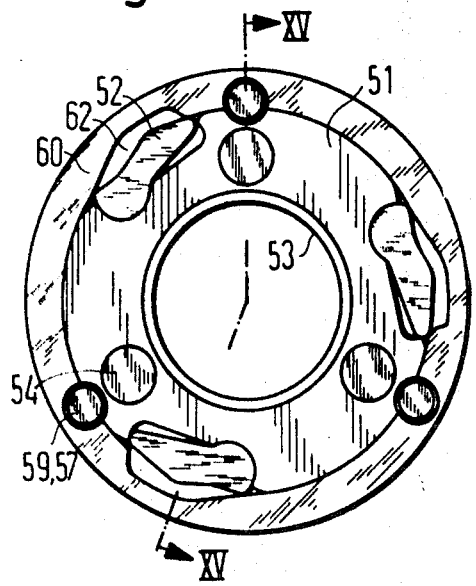
FIG. 14 is a side-elevational view of another centrifugal governor of the invention on a scale larger than that of FIGS. 5 and 12.

Referring now to the drawing in detail, and initially to FIGS. 1 to 6, there is seen a dual-speed hub for the rear wheel of a bicycle. The hub is normally mounted on the nonillustrated bicycle frame by means of a fixedly attached shaft 16. The nonillustrated rim of the wheel is attached to an approximately cylindrical shell 24 coaxially rotatable about the shaft 16. The shell encloses a dual-speed transmission and is the output member of the transmission whose input member is a driver 21 rotatable on the shaft 16 and carrying a sprocket 22.

Shafts 20 on the driver 21 carry two or more planet gears 18 which simultaneously mesh in the shell 24 with a sun gear 19 cut into the shaft 16 and an enveloping ring gear 17. A common retaining ring 23 axially secures the planet gears 18 on their shafts 20 and is splined to a sleeve 15. An annular pawl carrier 1 is coaxially rotatable on the sleeve 15 and carries two diametrically opposite pawls 2 movable in respective pockets of the outer carrier circumference. The pawls are retained in the respective pockets by a common annular wire spring 7 which biases each pawl toward driving engagement with a ratchet ring 8 fixed to the inner wall of the hub shell 24. The carrier 1 is splined to the ring gear 17 for joint rotation about the hub axis.

The end of the sleeve 15 remote from the driver 21 threadedly engages another annular carrier 12 for pawls 25 similar to the aforedescribed pawls 2 and biased toward engagement with a ratchet rim 26 on the inner wall of the hub shell 24. The conical movable member 13 of a coaster brake is mounted on the carrier 12 for conforming engagement with a brake member 14 secured on the shaft 16, when the carrier 12 moves toward the left from the position shown in FIG. 1.

As far as described so far, the illustrated hub is basically conventional in its structure and in its operation. As long as the pawls 2 engage the ratchet ring 8 and turn the hub shell 24 at the speed of the ring gear 17, which is higher than the input speed of the driver 21, the ratchet 26 on the hub shell over-travels the pawls 25 rotating at the speed of the driver 21 to which the sleeve 15 is coupled by the retaining ring 23. When the pawls 2 are disengaged from the ratchet ring 8, the hub shell is rotated by the pawls 25 at the lower input speed. When the driver 21 is rotated backwards, as by backpedaling, the brake members 13, 14 are engaged by threaded movement of the carrier 12 on the sleeve 15.

This invention is concerned more specifically with a centrifugal governor which controls the engagement of the pawls 2 and the ratchet ring 8, and with the cooperation between the governor and the pawls.

As is best seen in FIGS. 2 to 6, two axial bores diametrically opposite each other near the outer circumference of the carrier 1 hold partly knurled pivot pins 3 by a press fit. A flyweight 4 is pivoted on each pin 3 and axially secured by a retaining clip. As is shown in FIGS. 3 and 4, each of the two identical flyweights 4 is basically a rod of rectangular cross section bent into an arc of almost 180°. One end of the flyweight is reduced in thickness and receives the pin 3. A boss 6 projects from the flyweight near the pin 3. The other end of the flyweight carries an axially projecting coupling pin 9, the boss 6 and coupling pin 9 being directed toward the pawl carrier 1. A wire spring 5 loosely coiled about the pin 3 biases each flyweight in an angular direction to hold the pin 9 near the axis of rotation of the carrier 1.

Respective axially opposite faces of the carrier 1 an of the flyweights 4 bound a narrow annular space which extends radially outward from a shoulder of the carrier 1 and receives a coupling disc 10 of sheet metal. The disc 10, as shown separately in FIG. 2, has an annular body portion from which lugs project in opposite radial directions. Radial slots 11 in the lugs are outwardly open.

As is shown in FIGS. 5 and 6, the body portion of the disc 10 has an inner diameter chosen for rotatable seating of the disc on the shoulder of the carrier 1, and an outer diameter to clear the pins 3, 9 which are located on a common circle about the carrier axis in the illustrated rest position of the hub, and the bosses 6 which are offset from the circle in a radially outward direction. The slots 11 respectively receive the coupling pins 9, and the lugs on the disc 10 are far enough from the pins 3 to permit a desired circumferential movement of the disc 10 relative to the carrier 1.

In the illustrated position of the governor, the two bosses 6 respectively retain the tips of the pawls 2 in the pockets of the carrier 1 and prevent engagement of the pawls with the ratchet ring 8. When the joint rotation of the driver 21, the sleeve 15, and the carrier 1 about their common axis reaches a speed at which the centrifugal forces acting on the flyweights 4 can overcome the restraint of the springs 5, the flyweights swing in a common clockwise direction, as viewed in FIGS. 3 and 5, on their pivot pins 3, and thereby turn the coupling disc 10 in the same direction about the axis of hub rotation. The bosses 6 are withdrawn from the tips of the pawls 2, and the pawls are swung by the spring 7 into engagement with the ratchet ring 8.

When the rotary speed of the driver 21 exceeds a limit determined by the properties of the governor, the transmission ratio of the hub is thus increased. When the input speed of the driver 21 is decreased, or the driver is stopped, the flyweights are returned to the illustrated position, and the disc 10 is turned counterclockwise as viewed in FIG. 5. Cam faces of the bosses 6 obliquely inclined relative to corresponding radii on the hub axis engage the pawls 2 and again retract the pawls out of reach of the ratchet ring 8, as illustrated. The transmission ratio of the hub is thereby decreased to its original value.

The governor assembly on the carrier 1 is symmetrical relative to its axis of rotation in all operative positions of the flyweights 4. The flyweights are identical and interchangeable, as are the associated pivot pins 3 and return springs 5. The flyweights thus cannot upset the static and dynamic balance of the hub and can be manufactured at lower unit cost than two dissimilar flyweights.

The two-speed hub illustrated in FIG. 7 is identical with the aforedescribed hub except for its centrifugal governor and details in the configuration of the pawls whose engagement is controlled by the governor. The description of the second embodiment will thus be limited to the governor and closely associated elements, seen in detail in FIGS. 8 to 13. The elements common to FIGS. 1 and 7 are designated by the same numerals in both Figures and do not require repeated description.

The pawl carrier 31 which is connected to the ring gear 17 carries two pawls 32 in diametrically opposite, circumferential pockets in which they are held by the pawl spring 7. Diametrically opposite, axial pins 33 are slidably received in corresponding bores of the carrier 31 and are each secured against axial movement in one direction by an enlarged head, and against movement in the opposite direction by a flyweight 34 retained by a spring clip on the pin 33. The flyweights 34 are similar to the weights 4 in being of rectangular cross section and extending in an arc of almost 180° about the hub axis in the normal illustrated position toward which they are biased by a return spring 35 coiled about each pin 33.

As is best seen in FIG. 12, the pawls 32 and flyweights 34 are mounted on the pawl carrier 31 in an arrangement which is symmetrical relative to the axis of rotation of the carrier, each pawl being offset about 60° from the nearest pin 33.

Each of the two identical flyweights 34 is provided with a bore for the associated pivot pin 33 and adjacent thereto with another bore in which a control pin 36 of stepped cylindrical shape is normally held firmly by a friction fit in radial alignment with the pin 33 relative to the axis of pawl carrier rotation in the illustrated rest position, and relative to the axis of curvature of the inner flyweight face. The pins 36 project axially from the associated weights 34 toward the carrier 31 and are received in radial slots 38 in the circumference of a flat annular coupling and control disc 37 of sheet metal rotatably mounted on a shoulder of the carrier 31 between closely adjacent, opposite, radial faces of the carrier and of the flyweights 34. The disc 37 thus couples the flyweights 34 for joint movement on their respective pivot pins 33 either under the influence of centrifugal forces or under the influence of their return springs 35.

Apertures 39 are arranged in the disc 37 for receiving edge portions of the pawls 32 (FIG. 12). The walls of the apertures 39 cammingly engage the axially coextensive edge portions of the pawls during pivoting movement of the flyweights 34 toward the axis of rotation of the carrier 31 to withdraw the pawls from engagement with the ratchet ring 8, and to lock the pawls in the retracted position as shown in FIG. 12. When the disc 37 is turned clockwise, as seen in FIG. 12, by the flyweights 14 pivoting away from the axis of rotation against the restraint of their return springs 35, the disc 37 releases the pawls 32 for driving engagement with the ratchet ring 8 on the hub shell 24.

The radially inner ends 40 of the slots 38 (FIG. 8) are circumferentially enlarged, and are outside the path of the control pins 36. The pivot pins 33 pass through the enlarged slot portions 40 with sufficient circumferential clearance to permit the desired angular movement of the disc 37 on the pawl carrier 31. The central opening 41 of the disc 37 matches the shoulder of the carrier 31.

Figure 15:
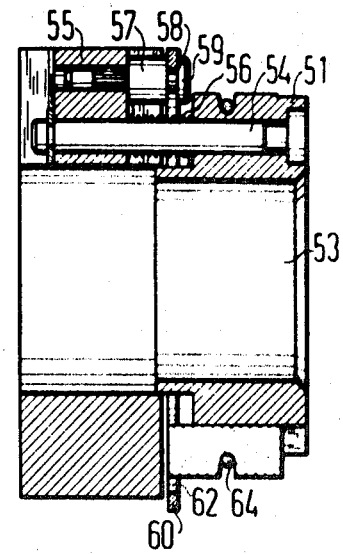
FIG. 15 is a section of the device of FIG. 14 on the line XV—XV.
Figure 16:
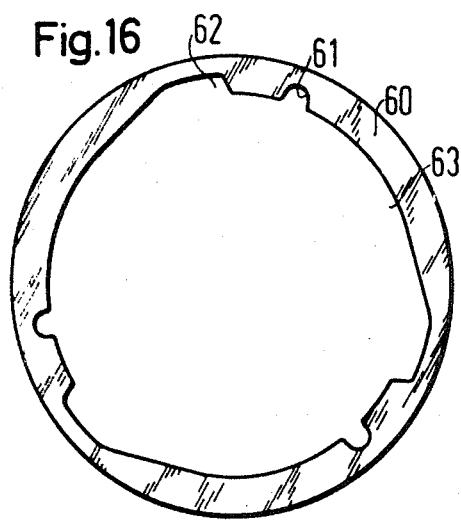
FIG. 16 shows a control element of the governor of FIG. 14 in a corresponding view.
Figure 17:
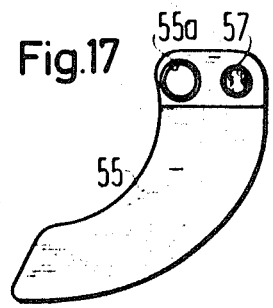
FIG. 17 illustrates a flyweight in the governor of FIG. 14 in side elevation.
Figure 18:
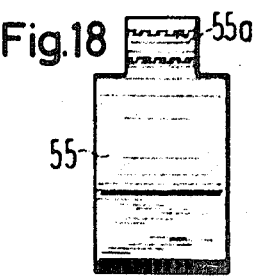
FIG. 18 is a side-elevational view of the flyweight of FIG. 17.

The third centrifugal governor of the invention shown in FIGS. 14 to 18 is interchangeable in the hub of FIGS. 1 and 7 with the aforedescribed governors. A carrier 51 is provided with three equiangularly spaced pockets in which respective pawls 52 are secured by a pawl spring 64 biasing the pawls radially outward toward engagement with the ratchet ring 8, not itself shown in FIGS. 14 to 18.

A central axial bore 53 in the carrier 51 normally receives the sleeve 15 and the shaft 16. Three pins 54, closely similar to the pins 33, project axially from a radial end face of the carrier 51 at distances of 120° from each other and carry respective flyweights 55 which differ from the flyweights 34 mainly by their reduced arcuate length necessitated by the provision of three, rather than two flyweights. Each flyweight 55 is provided with a return spring 56 and extends from its pivot pin 54 mainly in a clockwise direction, as viewed in FIG. 14.

An axial bore offset in each flyweight 55 in a radially outward direction from the bore 55a receiving the pivot pin 54 is tightly engaged by a reduced axial end portion of a control pin 57 which is formed with an annular, circumferential groove 58 closely adjacent the other axial end 59 of the control pin.

The several flyweights 55 are coupled to each other, and the pawls 52 are controlled by a radially narrow coupling and control disc 60 of sheet steel whose central opening 63 is large enough to receive the pawls 52 and the pivot pins 54. Three equiangularly spaced inwardly open radial notches 61 in the disc 60 respectively engage the three control pins 57, the edges of the notches being dimensioned for a sliding fit about the reduced part of each pin 57 in the groove 58 of the latter so that the disc 60 is radially and axially secured on the pins 57. The bottom of each notch 61 is semicylindrical for conforming engagement with the associated control pin 57. Three cam faces 62 on the inner circumference of the ring 60 cammingly cooperate with the pawls 52 in the manner described above for retracting the pawls from the associated ratchet ring 8 or for releasing the pawls for engagement with the ring 8 under the biasing force of the common pawl spring 64.

The embodiment illustrated in FIGS. 14 to 18 is representative of centrifugal governors of the invention having more than two flyweights and more than two pawls, and the number of flyweights may be further increased beyond three while maintaining all basic features of the last-described embodiment. Even with four or more control pins corresponding to the pins 57, the bearing friction on the control and coupling disc 60 or its equivalent is particularly low as compared to a disc journaled on a shoulder of the pawl carrier, a feature important in permitting a reduction in the mass of the flyweights without reduction in the effective force available for switching the pawls.

The number of pawls need not necessarily be identical with the number of flyweights. Two pawls may be used in an obvious manner with four flyweights, and a wider choice in the number of pawls is available with six flyweights whose pivot axes are equiangularly spaced about the axis of rotation, and which all swing in a common first angular direction under the influence of centrifugal forces and are biased in a common second angular direction by their respective return springs. Not each flyweight need be provided with an individual return spring because of the coupling of the flyweights to each other.

While the three illustrated centrifugal governors of the invention have been described with reference to their functions in a dual-speed bicycle hub, they may be employed to advantage in other multiple-speed drive arrangements in which good balancing and immunity from malfunctioning under sudden acceleration transverse to the axis of rotation are important. Such applications include the drive arrangement of any domestic washing machine in which the tub together with the drive arrangement is floated on springs in the supporting housing. When a centrifugal governor is provided, its reliability may be impaired by gyrations and vibration of an unevenly loaded tub unless the governor is of the type described above. Other multiple-speed drive arrangements which can benefit from a centrifugal governor of the invention will readily suggest themselves to those skilled in the art.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. In a multiple-speed drive arrangement having a rotatable input member, a rotatable output member, multiple-speed transmission means operatively interposed between said members for rotating said output member at any one of a plurality of speeds when said input member rotates at a predetermined speed, said transmission means including a clutch having two clutch elements engageable for drivingly connecting said members, and a centrifugal governor including a carrier connected to one of said members for rotation about an axis when said one member rotates, flyweight means mounted on said carrier for movement away from said axis of rotation in response to centrifugal forces generated by rotation of said carrier, yieldably resilient returning means biasing said flyweight means toward said axis of rotation, and motion-transmitting means connecting said flyweight means to one of said clutch elements for operating said clutch in response to said movement of said flyweight means, the improvement in the centrifugal governor which comprises:
   a. a plurality of pivots on said carrier having respective parallel pivot axes symmetrically spaced about said axis of rotation;
   b. said flyweight means including a plurality of flyweight members respectively mounted on said pivots for movement about the respective pivot axes in a first common angular direction in response to said centrifugal forces, and biased in a second common angular direction opposite to said first direction by said returning means, and
   c. coupling means mounted for movement about said axis of rotation and coupling said flyweight members to each other for joint movement in each of said common directions, said coupling means including
      1. a flat annular disc member rotatable about said axis and axially interposed between said carrier and said flyweight members, and
      2. cooperating engagement means on said disc member and on each of said flyweight members angularly displacing said disc member about said axis in response to movement of each one of said flyweight members in one of said angular directions, and displacing another flyweight member in said one angular direction in response to the angular displacement of the disc member.

2. In an arrangement as set forth in claim 1, said one clutch element being a pawl, and the other clutch element being a ratchet, said pawl being mounted for tilting movement into and out of engagement with said ratchet.

3. In an arrangement as set forth in claim 1, said disc member being formed with a plurality of openings therein, said openings being located symmetrically relative to said axis of rotation, said engagement means including a control member axially projecting from each of said flyweight members into respective openings of said disc member, said control member being spaced from the pivot axis of the associated flyweight member.

4. In an arrangement as set forth in claim 3, said motion-transmitting means including cam means on said disc member engageable with said one clutch element for disengaging said one clutch element from the other clutch element when said disc member is moved about the axis of rotation by said control members during movement of said flyweight members in one of said common directions.

5. In an arrangement as set forth in claim 4, said disc member being formed with a plurality of apertures communicating with said openings respectively, each pivot including a pivot pin passing through a respective one of said apertures.

6. In an arrangement as set forth in claim 5, said disc member being formed with yet another aperture circumferentially spaced from said first-mentioned apertures and bounded by said cam means.

7. In an arrangement as set forth in claim 6, said opening being a radial slot open in a radially outward direction.

8. In an arrangement as set forth in claim 7, said first-mentioned apertures and said other aperture being substantially equidistant from said axis of rotation.

9. In an arrangement as set forth in claim 4, said cam means including a cam face on one of the circumferences of said disc member, and said openings being radially open toward said one circumference.

10. In an arrangement as set forth in claim 9, said plurality of flyweight members including at least three flyweight members, and said plurality of openings including at least three openings.

11. In an arrangement as set forth in claim 9, said one circumference being the inner circumference of said disc member.